UNITED STATES PATENT OFFICE.

LEE F. HAWLEY, OF BOSTON, MASSACHUSETTS, ASSIGNOR TO ARTHUR D. LITTLE, INC., OF BOSTON, MASSACHUSETTS, A CORPORATION OF MASSACHUSETTS.

PROCESS OF REFINING WOOD-ALCOHOL.

1,106,707.     Specification of Letters Patent.     Patented Aug. 11, 1914.

No Drawing.     Application filed April 13, 1914. Serial No. 831,582.

*To all whom it may concern:*

Be it known that I, LEE F. HAWLEY, a citizen of the United States, residing at Boston, in the county of Suffolk and State of Massachusetts, have invented certain new and useful Improvements in Processes of Refining Wood-Alcohol, of which the following is a specification.

This invention relates to processes of refining crude wood alcohol, and recovering acetone therefrom. The term "crude wood alcohol" is used herein to include all products obtained by distillation of wood or other ligneous materials, and containing methyl alcohol and acetone.

In the distillation of crude wood alcohol for the production of methyl alcohol or refined wood alcohol, much difficulty is encountered in the separation from the methyl alcohol of the other principal constituent of the crude alcohol, viz., acetone. Not only do these two liquids have boiling-points close together in the temperature scale, but they also form a constant-boiling mixture, so that their complete separation by distillation alone is impossible. In practice, therefore, it is not attempted to recover pure acetone, but two main products are produced, to wit, a mixture sometimes called "methyl-acetone" which contains only about 50 per cent of acetone; and a refined wood alcohol contains from 0.1 per cent. to ten per cent. of acetone. The relative proportions in which these two products are obtained depends upon their relative composition, and on the efficiency of the fractionation.

According to the present invention, it becomes possible to separate the fraction high in acetone, the so-called "methyl-acetone" of commerce, into (1) acetone, entirely free from alcohol, and (2) a mixture of alcohol and acetone so high in alcohol that it can be sent back and included in the distillation process without interfering with the latter. By proceeding in this manner, the two final products are acetone nearly or quite free from alcohol, and alcohol containing only a very small variable amount of acetone, according to the efficiency of the distillation process.

The production of acetone free from alcohol in accordance with the present invention depends on the fact that methyl alcohol is readily soluble in aqueous solutions of sodium or potassium hydroxid, while acetone is relatively insoluble in such solutions, so that when the proper proportions of alcohol, acetone, water, and sodium or potassium hydroxid are brought together, two liquid layers or strata are formed, of which the upper contains a relatively large proportion of acetone while the lower contains relatively large proportions of alcohol dissolved in the aqueous caustic alkali. Satisfactory separation of alcohol and acetone often can not be obtained by a single treatment of this kind, but by means of a short series of treatments in which the lower or alkaline layer from one treatment is added to the upper layer from a preceding treatment, and so forth, it is possible to obtain at one end of the series an acetone free from alcohol, and at the other end of the series an alcohol containing only a small proportion of acetone.

The following is a concrete, illustrative example of a process in accordance with my invention, this example showing the combination of such a fractional solution process with fractional distillation for the complete refining of crude wood alcohol: 100 parts of crude wood alcohol containing 85 per cent. of alcohol and acetone, in a ratio of about 4 to 1, are separated by fractional distillation into three fractions, viz.: (1) 35 parts of so-called "methyl-acetone" containing about 50 per cent. of acetone; (2) 50 parts of a refined methyl alcohol consisting of 98 per cent. alcohol and 2 per cent. acetone; (3) 15 parts of water, allyl alcohol, "wood oils," and other impurities.

The methyl-acetone fraction (1) is treated with caustic soda solution in a series of four washings, of which the first washing is with a caustic soda solution which has been used three times before; the second with a solution used twice before; the third with a solution used once before; and the fourth with a fresh caustic soda solution of about thirty per cent. concentration and in volume about equal to the original methyl-acetone treated. The final upper layer after this series of washings, consists of acetone and water quite free from either alcohol or caustic soda, and adapted by simple distillation to yield a marketable product. The final lower layer contains alcohol, acetone, water, and caustic soda, and by distillation gives: (1) a mixture of alcohol, acetone, and a small amount of water which can be returned to the original distillation refining process, and (2) a solution of caustic soda which can be used again in the treatment of another lot of methyl-acetone. It is to be understood that other quantities and compositions of materials, and other numbers of washings may be used, depending on the particular conditions, including the quality of refined alcohol which it is desired to produce and the efficiency of the refining still; or, if desired, the alcohol-acetone mixture may be marketed without further refining.

I claim:—

1. In a process of refining crude wood alcohol containing acetone, the step which consists in effecting a separation of a layer rich in acetone by means of alkali, and subjecting said layer to a further refining process.

2. In a process of refining crude wood alcohol, the steps which consist in subjecting a mixture containing methyl alcohol and acetone to repeated fractional solution with aqueous alkali, under conditions to obtain an acetone-containing layer substantially free from alcohol, and an alcohol-containing layer low in acetone.

3. The method of separating acetone from mixtures thereof with methyl alcohol, which consists in stratifying the mixture by addition of alkali, and purifying the stratum richer in acetone by dissolving the residual alcohol therefrom.

4. The method of separating acetone from mixtures thereof with methyl alcohol, which consists in stratifying the mixture by addition of alkali, and purifying the stratum richer in acetone by dissolving the residual alcohol therefrom by means of an aqueous solution of alkali.

5. The method of separating acetone from mixtures thereof with methyl alcohol, which consists in stratifying the mixture by addition of alkali, and purifying the stratum richer in acetone by dissolving the residual alcohol therefrom by successive treatments with aqueous solutions of alkali.

6. The method of separating acetone from mixtures thereof with methyl alcohol, which consists in fractionally dissolving alcohol from the mixture by successive treatments with caustic alkali solutions previously used for treating similar mixtures, and effecting a final purification by caustic alkali free from alcohol.

7. The method of refining crude wood alcohol, which consists in fractionally distilling the same, fractionally dissolving methyl alcohol from the distillation fraction highest in acetone by means of aqueous solutions of alkali, distilling the resulting solution of methyl alcohol, and returning the distillate to the fractional distillation process.

8. The method of recovering acetone and methyl alcohol from mixtures thereof, which consists in dissolving the alcohol in aqueous caustic alkali, collecting and distilling the acetone, and distilling the alkaline alcoholic solution for the recovery of alcohol low in acetone and an aqueous alkaline solution in condition for re-use.

9. The method of recovering acetone and methyl alcohol from mixtures thereof, which consists in fractionally dissolving the alcohol in successive portions of aqueous alkali, collecting and distilling the acetone, and distilling the alkaline alcoholic solution for the recovery of alcohol low in acetone and an aqueous alkaline solution in condition for re-use.

In testimony whereof I affix my signature in presence of two witnesses.

LEE F. HAWLEY.

Witnesses:
 CHAS. M. BULLARD,
 ARTHUR O. SPIERLING.